United States Patent [19]

Mercer

[11] Patent Number: 5,745,679
[45] Date of Patent: Apr. 28, 1998

[54] METHOD AND DEVICE FOR FILE TRANSFER BY CASCADE RELEASE

[75] Inventor: Thomas J. Mercer, Meridian, Id.

[73] Assignee: Micron Technology, Inc., Boise, Id.

[21] Appl. No.: 611,798

[22] Filed: Mar. 6, 1996

[51] Int. Cl.⁶ .................. G06F 9/44; G06F 9/46; G06F 17/30
[52] U.S. Cl. .................. 395/200.01; 395/200.03; 395/200.05; 395/200.16; 395/675
[58] Field of Search .............. 395/200.01, 200.03, 395/200.05, 200.16, 200.17, 617, 675, 703, 710, 187.01, 610, 611; 364/284.4, 282.1, 242.95, 283.1, 284.3, 230.3, 260.1, 281.8, 282.4, 283.2, 222.82, 242.96, 281.3, 282.3, 254.3, 281, 281.7

[56] References Cited

U.S. PATENT DOCUMENTS

| | | | |
|---|---|---|---|
| 4,625,081 | 11/1986 | Lotito et al. | 379/88 |
| 4,625,308 | 11/1986 | Kim et al. | 370/321 |
| 4,974,149 | 11/1990 | Valenti | 395/800 |
| 5,274,768 | 12/1993 | Traw et al. | 395/200.2 |
| 5,276,879 | 1/1994 | Barry et al. | 385/676 |
| 5,355,478 | 10/1994 | Brady et al. | 395/407 |
| 5,380,991 | 1/1995 | Valencia et al. | 235/383 |
| 5,513,130 | 4/1996 | Redmond | 364/578 |
| 5,535,229 | 7/1996 | Hain, Jr. et al. | 395/185.02 |
| 5,537,592 | 7/1996 | King et al. | 395/616 |
| 5,548,724 | 8/1996 | Akizawa et al. | 395/200.03 |
| 5,548,759 | 8/1996 | Lipe | 395/611 |
| 5,559,933 | 9/1996 | Boswell | 395/114 |
| 5,561,799 | 10/1996 | Khalidi et al. | 395/616 |
| 5,576,755 | 11/1996 | Davis et al. | 384/13 |
| 5,581,764 | 12/1996 | Fitzgerald et al. | 395/703 |
| 5,590,288 | 12/1996 | Castor et al. | 395/200.03 |
| 5,619,689 | 4/1997 | Kelly | 395/617 |
| 5,621,894 | 4/1997 | Menezes et al. | 395/200.12 |
| 5,623,600 | 4/1997 | Ji et al. | 395/187.01 |

FOREIGN PATENT DOCUMENTS

| | | | |
|---|---|---|---|
| 0 666 671 A1 | 8/1995 | France | H04L 29/06 |
| 6-350784 | 12/1994 | Japan | H04N 1/00 |
| 2 256 558 | 6/1991 | United Kingdom | H04N 1/32 |
| WO 93/2272 | 4/1992 | WIPO | G06F 11/00 |

*Primary Examiner*—Emanuel T. Voeltz
*Assistant Examiner*—Cuong H. Nguyen
*Attorney, Agent, or Firm*—Schwegman, Lundberg, Woessner & Kluth, P.A.

[57] ABSTRACT

A method and apparatus for transferring data files to several computers on a network is disclosed. The cascade release maintains a list of computers to which the file is to be distributed. This list is subdivided and only the first computers on the lists are transferred the file and the subdivided list. These computers themselves take the subdivided list and further subdivide it and transfer the file to the computers now first on the new lists. This continues until all computers receive the distributed file. In order to ensure the integrity of transfer, an initial checksum is compared to the checksum of the transferred files.

6 Claims, 7 Drawing Sheets

METHOD AND DEVICE FOR FILE TRANSFER BY CASCADE RELEASE

FIELD OF THE INVENTION

The present invention relates to computers systems and in particular to file transfers in computer networks.

BACKGROUND

Computer networks can consist of a group of computers which perform the same tasks. For example, each personal computer in a corporate network may be used for word processing, or in a software company they may be used to develop and to test software. Such networked computers each run the same computer applications to do the word processing, developing, and testing tasks.

When an enhancement is made to the word processing, developing or testing software, or when new data files are created for such systems, the files (whether software object code or structured database information) must be loaded on each computer in the network. Thus, in a computer system made up of many computers, the single file must be transferred many times. This transfer can be time consuming. The computer having the file to be transferred among the computers must spend considerable time to distribute the file to each of the computers. If the file transferred is crucial to a phase of testing or development, the entire network may need to wait until the file is transferred to every computer before the phase can begin.

There is a need in the art to mitigate the time bottleneck associated with linear transfer of a computer file to a group of computers. Such an invention should ensure that the file is successfully transferred to each computer without corruption and it should not require the extensive time of any one of the computers to act as a controller for the process.

SUMMARY OF THE INVENTION

The present invention is a method and device for distributing files to a group of networked computers using a non-linear method. A list is compiled of the computers to which the file is to be distributed. This list is divided into smaller lists. The computer initially storing the file to be transferred distributes the file to just the first computers on the smaller lists. Each of the computers receiving the file then begins the same task of breaking the smaller lists into yet smaller lists and in transferring the file to the first computer of each of the smaller lists. This recursive method of distribution continues until the file has been disseminated to all of the necessary computers.

After transferring the file, each computer calculates a checksum and compares it to the checksum of the original version of the file. This ensures that the file does not suffer corruption during the transfer.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements having the same number perform essentially the same functions.

Figure 1:
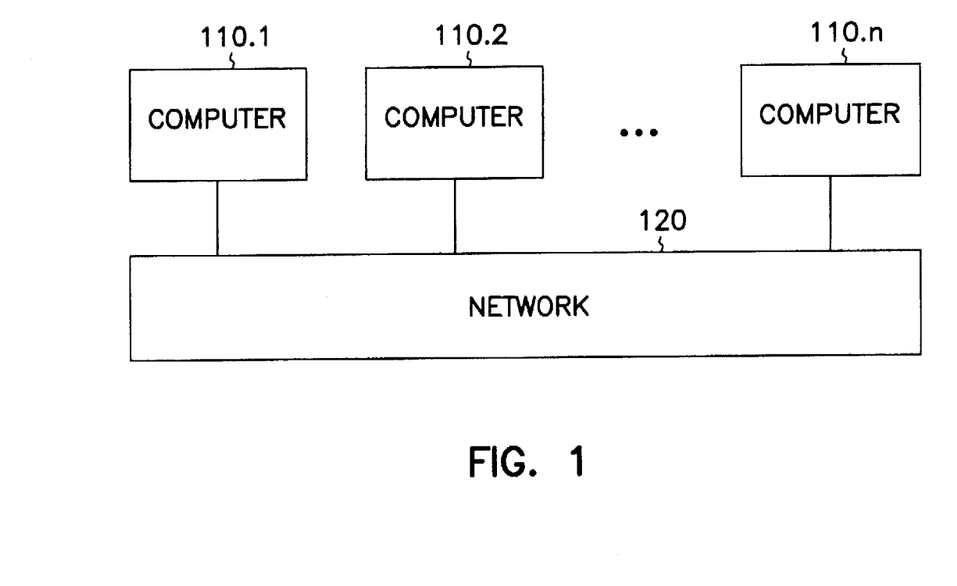
FIG. 1 is a block diagram of a plurality of computers connected across a network.

Computers are often connected together in a network. In FIG. 1, a plurality of computers 110.1 through 110.n are connected across a network 120. Computers 110 can be personal computers, mainframes, or other types of computing devices. Network 120 could be implemented in several topologies, including, but not limited to, a ring, star, or bus.

Figure 2:
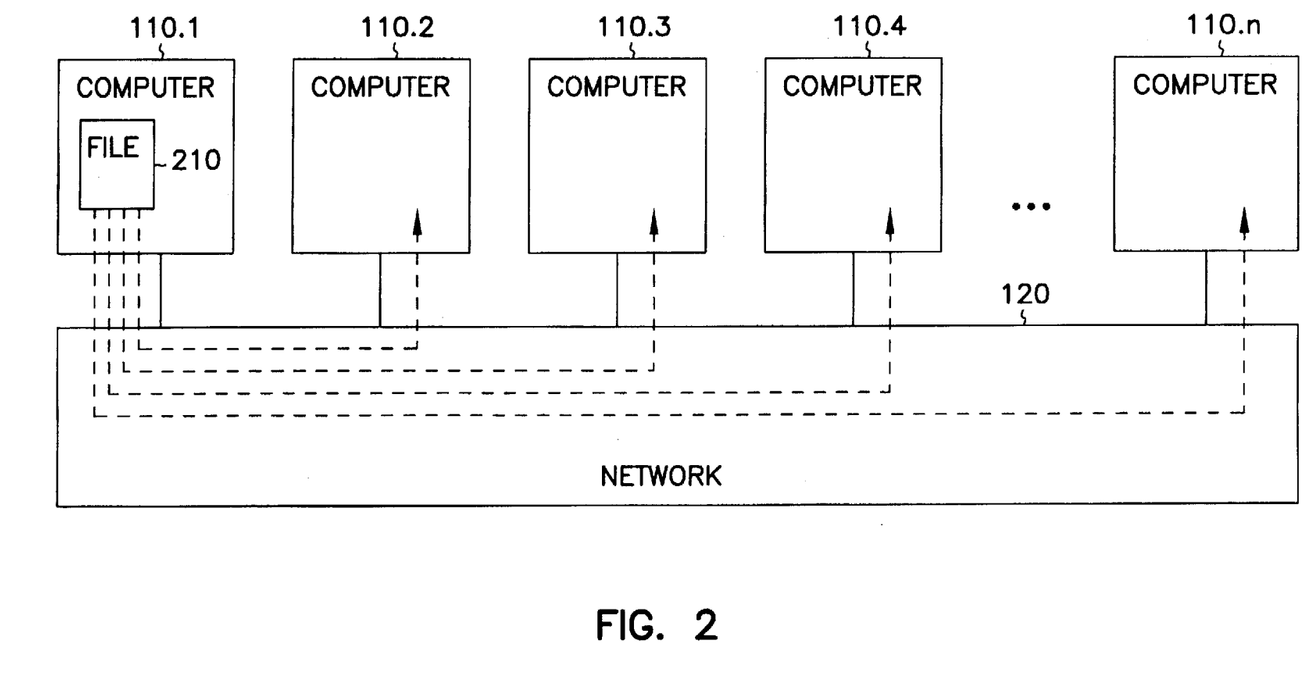
FIG. 2 is a block diagram showing a computer on the network using the linear method of file distribution.

When computers 110 are networked together, it may often be because such computers 110 are used for a common purpose, such as word processing or software development and testing. Each of the computers 110 may need to have the same software and data files in order to perform such common duties. When a new application is acquired, an enhancement to an application is made, or a data file is updated, the computer file must be loaded on each computer 110.1 through 110.n. FIG. 2 illustrates a traditional linear approach to file distribution. In FIG. 2, the file 210 resides in an initial computer 110.1. The initial computer 110.1 first transfers file 210 to a second computer 110.2. Then initial computer 110.1 transfers file 210 to a third computer 110.3, and a fourth computer 110.4. This transfer continues until initial computer 110.1 transfers file 210 to final computer 110.n. Because each of these transfers is initiated after the previous transfer is completed, to transfer file 210 to final computer 110.n takes n number of consecutive transfers by initial computer 110.1. If n is large, initial computer 110.1 is burdened with a large amount of time in distributing the file.

Figure 3A:
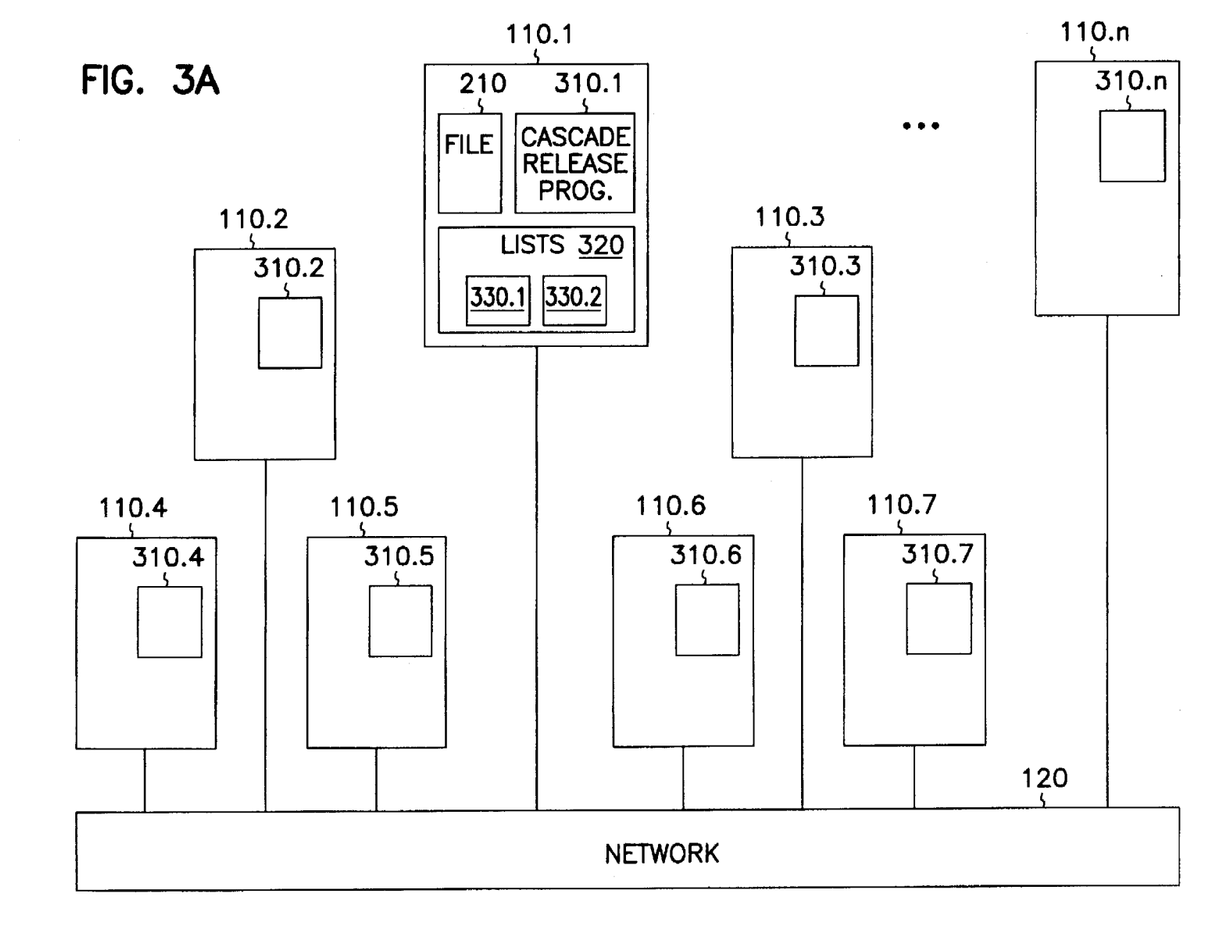
FIGS. 3A, 3B and 3C are block diagrams showing a computer on the network using the cascade release method of file distribution.
Figure 3B:
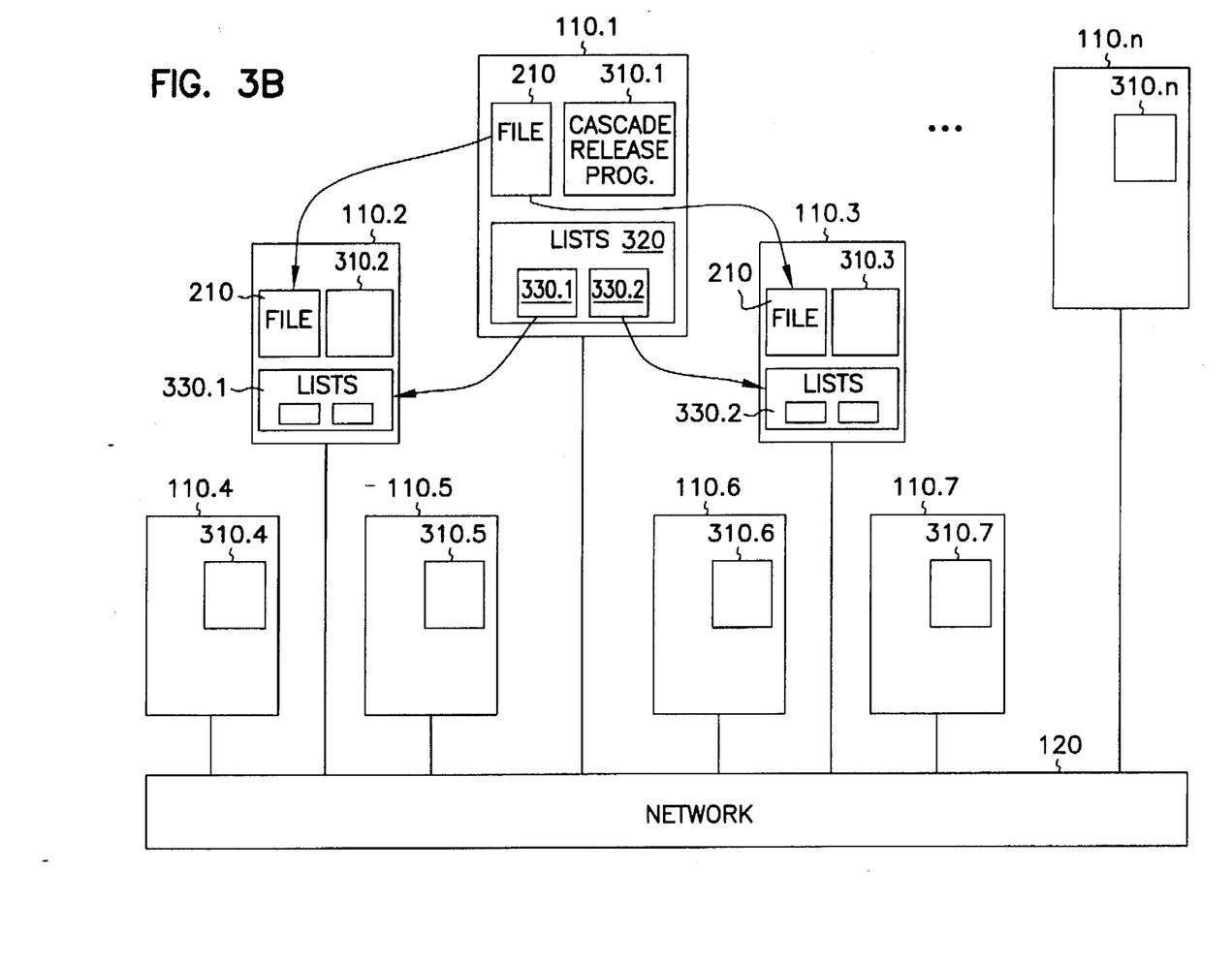
Figure 3C:
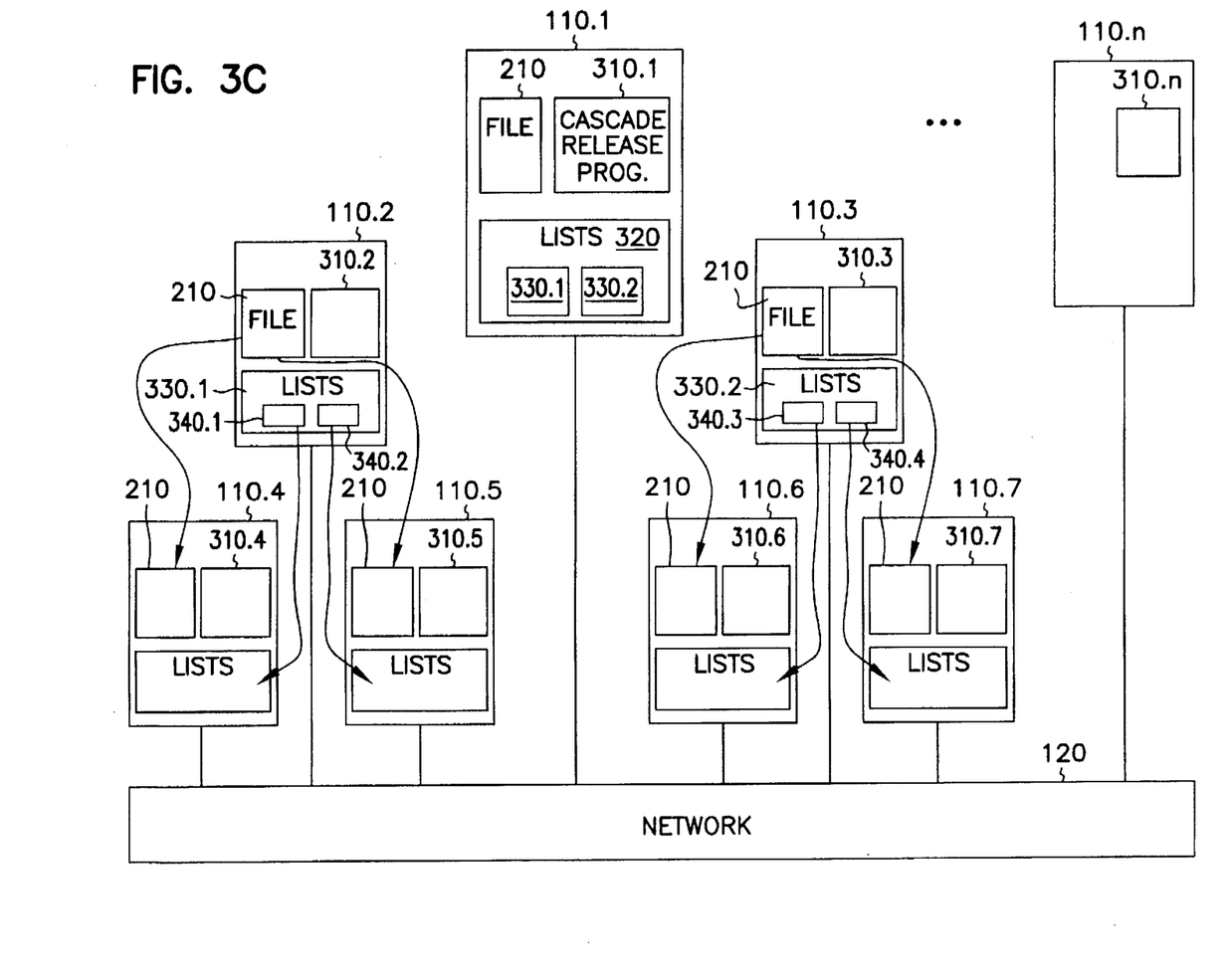

The present invention, in one embodiment, is shown in FIGS. 3A, 3B and 3C. In FIG. 3A, cascade release program 310 is stored in RAM in all computers 110.1 through 110.n. In one embodiment, cascade release program is implemented using C shell script. Initial computer 110.1 has file 210 to be distributed to the remaining computers 110.2 through 110.n. Initial's computer's cascade release program 310.1 compiles a list of recipient computers 320. In one embodiment, list of recipient computers 320 is divided into two smaller lists 330.1 and 330.2. In other embodiments, list of recipient computers 320 could be divided into more than two sublists.

FIG. 3B shows the initial stage of distributing file 210. In one embodiment, file 210 is usually between two and four megabytes in size. In FIG. 3B, cascade release program 310.1 transfers file 210 from initial computer 110.1 to the first computer found on the first smaller list 330.1 and the first computer named on second smaller list 330.2, namely second computer 110.2 and third computer 110.3. Smaller list 330.1 is transferred to second computer 110.2 and smaller list 330.2 is transferred to third computer 110.3. In FIG. 3C, cascade release program 310.2 and 310.3 is activated on these computers 110.2 and 110.3. Cascade release program 310.2 divides list 330.1 into another two smaller lists 340.1 and 340.2 and cascade release program 310.3 also divides its list 330.2 into two smaller lists 340.3 and 340.4.

Cascade release program 330.2 then transfers file 210 to fourth and fifth computers 110.4 and 110.5. Cascade release program 330.3 transfers file 210 to sixth and seventh computers 110.6 and 110.7. This cascading of file transfers gains momentum as each file transfer acts upon more and more networked computers 110. File distribution is continued until the final computer 110.n is reached.

Figure 4:
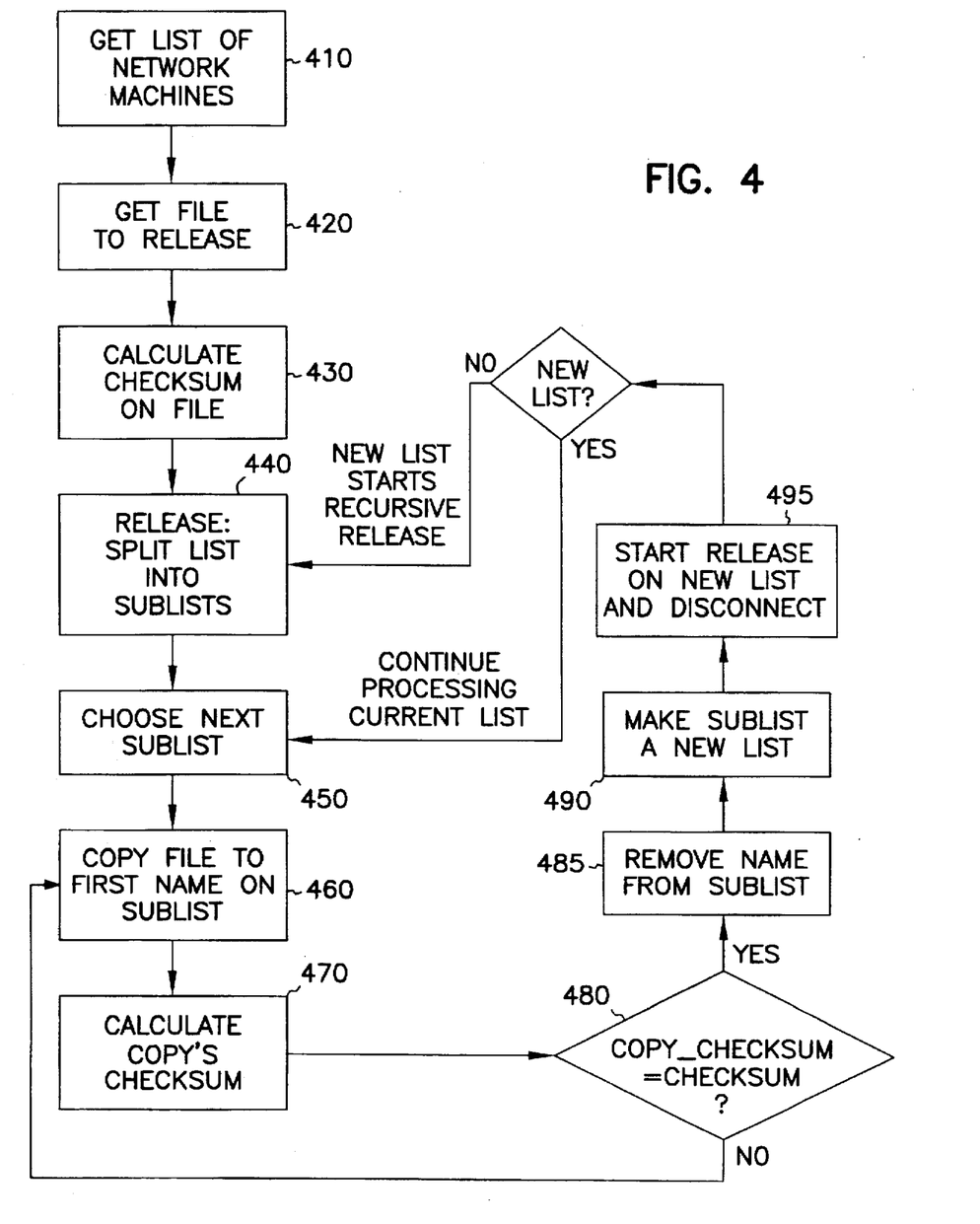
FIG. 4 is a flowchart of one embodiment of the cascade release method of file distribution.

FIG. 4 is a flowchart of one embodiment of cascade release program 310 which resides in each computer 110.1 through 110.n. When activated in the initial releasing computer 110.1, at step 410, cascade release program 310.1 produces a list of the computers 320 to which file 210 must be distributed. At step 420, cascade release program 310.1 identifies file 210 to be distributed. To ensure file integrity, a checksum is calculated for file 210 at step 430. Step 440 marks the beginning of the recursive Release procedure. At step 440, list 320 is subdivided into sublists 330. FIGS. 3A, 3B and 3C demonstrated the cascade release procedure utilizing two sublists 330.1 and 330.2. In other embodiments, however, at step 440, several sublists could be split out of list 320. Steps 450 and 495 loop through each sublist 340. For each sublist 340, at step 460, file 210 is distributed to the first computer named on that sublist. After the file 210 has been transferred, its checksum is calculated at step 470. At step 480, this checksum is compared to the original file's checksum which was calculated at step 430. As long as the checksums are equal, indicating that file 210 has been transferred without data corruption, the first computer's name is removed from the sublist at step 485. The sublist is then promoted to be a primary list for the computer at step 490. The computer's cascade release program 310 is activated at step 495. This newly activated copy of the cascade release program 310 repeats the Release procedure, using the list passed on to it at step 495.

Figure 5A:
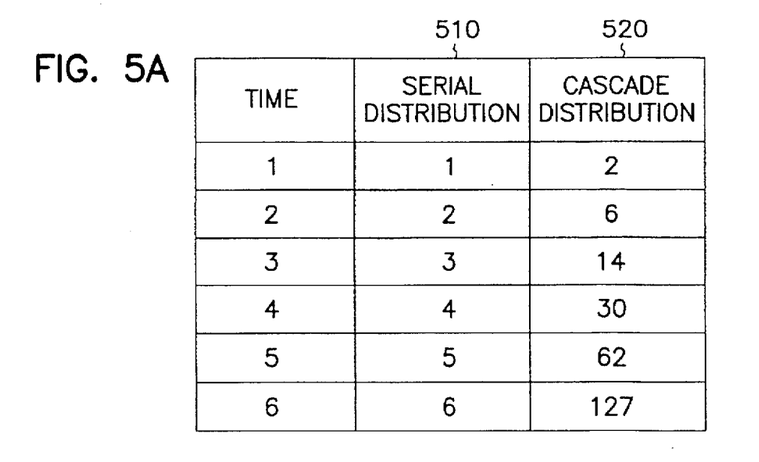
FIG. 5A is a chart and FIG. 5B is a line graph comparing time to the number of computers which can have a file distributed to them by both a linear and cascade method.
Figure 5B:
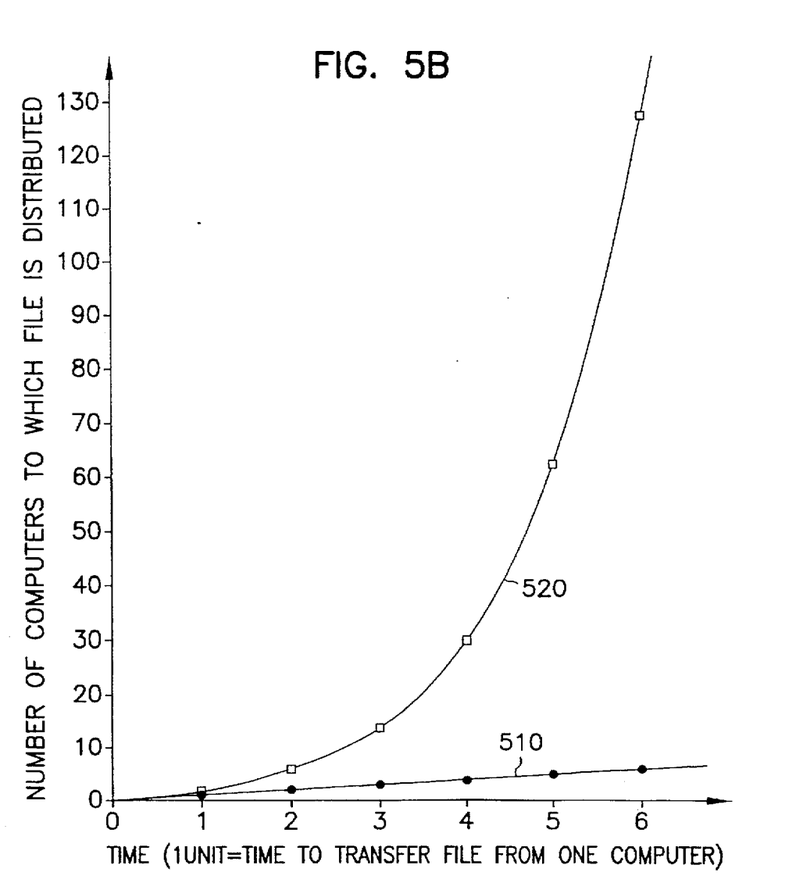

FIG. 5A is a chart and FIG. 5B is a corresponding line graph showing the approximate relationship between serial distribution 510 and cascade distribution 520 over time. These figures illustrate that cascade distribution is a much faster means for transferring a file to many networked computers than is linear distribution. As the number of computers to which the file must be distributed increases, the time-savings is greatly increased.

Other embodiments of the present invention are possible without departing from the scope and spirit of the present invention. In other embodiments of the invention, cascade release program 310 may divide the distribution list into three or more sublists, which would increase the rate of distribution in a large computer network even more than splitting the list into just two sublists. Or, cascade release program 310 may be implemented as an integrated part of a network system, allowing cascade release program 310 to use the network system's internally managed list of computers residing on the network rather than generating its own list of computers for the distribution list. Another embodiment of the cascade release program may exclude the checksum feature since most file transfer protocols now automatically perform similar tests to ensure the accuracy of the file transfer.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. A method for transferring files on a computer system having a plurality of computers, including a first computer, connected across a network, comprising the steps of:
   storing a file on the first computer to be distributed to the remaining plurality of computers in the computer system;
   compiling a master list on the first computer of the remaining plurality of computers in the computer system to which the file is to be distributed; and
   releasing the file based on the master list;
   wherein releasing the file comprises the recursive steps of:
      dividing the master list into a plurality of submaster lists, wherein a submaster list includes a top listed computer; and
      for each of the plurality of submaster lists:
         storing the file to the top listed computer on the submaster list;
         removing the top listed computer on the submaster list;
         converting the submaster list to a master list; and
         releasing the file based on the master list.

2. The method for transferring files as recited in claim 1, further comprising the step of calculating a master checksum of the file to be distributed; and
   wherein the step of releasing the file further comprises for each of the plurality of submaster lists, the steps of:
      calculating a checksum of the stored file;
      validating the checksum against the master checksum; and
      if the checksum is validated, removing the top listed computer on the submaster list.

3. In a primary computer having a memory, a cascade release device for controlling the transfer of files from the primary computer on a network having a plurality of computers, the device comprising:
   a cascade release program stored in the memory, wherein the cascade release program performs the tasks of:
      storing a file on the primary computer to be distributed to the remaining plurality of computers in the computer system;
      compiling a master list on the primary computer of the remaining plurality of computers in the computer system to which the file is to be distributed; and
      releasing the file based on the master list;
      wherein releasing the file comprises the recursive steps of:
         dividing the master list into a plurality of submaster lists, wherein a submaster list includes a top listed computer; and
         for each of the plurality of submaster lists performing the steps of:
            storing the file to the top listed computer on the submaster list;
            removing the top listed computer on the submaster list;
            converting the submaster list to a master list; and
            releasing the file based on the master list.

4. The cascade release device as recited in claim 3 wherein the cascade release program further performs the task of calculating a master checksum of the file to be distributed; and
   wherein the task of releasing the file further comprises for each of the plurality of submaster lists, the steps of:
      calculating a checksum of the stored file;
      validating the checksum against the master checksum; and if the checksum is validated, removing the top listed computer on the submaster list.

5. A system for file transfer, comprising:

a plurality of computers, including a first computer, each having a cascade release device; and a network connecting each of said plurality of computers;

wherein the cascade release device comprises:

a file handler which identifies a file to be distributed to the plurality of computers;

a master lister which compiles a master list of the computers from the plurality of computers to which the file is to be distributed;

a file releaser for distributing the file to the computers listed on the master list;

wherein the file releaser comprises:

a list divider which splits the master list into smaller submaster lists, each identifying a top-mentioned computer;

means for transferring the file to be distributed to the top-mentioned computer;

a list remover which removes the top-mentioned computer from the submaster list; and a list promoter which converts one of the smaller submaster lists into a master list.

6. The system for file transfer as recited in claim 5, further comprising a master-checksum calculator which determines a master checksum of a file to be distributed; and wherein the file releaser further comprises:

a checksum calculator which calculates a checksum of the file distributed; and a checksum validator which compares the checksum to the master-checksum; and wherein the list remover only removes the top-mentioned computer from the submaster list if the checksum validator finds that the checksum is equal to the master-checksum.

* * * * *